(12) United States Patent
Baker et al.

(10) Patent No.: US 7,798,365 B2
(45) Date of Patent: Sep. 21, 2010

(54) BULK TRANSFER DISPENSING DEVICE AND METHOD

(75) Inventors: Matthew Jason Baker, Cranberry Township, PA (US); Charles Henry Schnorr, III, Pittsburgh, PA (US); Ward T. Powell, Pittsburgh, PA (US); W. Thomas Urmson, Jr., Valencia, PA (US)

(73) Assignee: Portec Rail Products, Inc., Pittsburgh, PA (US)

( * ) Notice: Subject to any disclaimer, the term of this patent is extended or adjusted under 35 U.S.C. 154(b) by 983 days.

(21) Appl. No.: 11/505,634

(22) Filed: Aug. 17, 2006

(65) Prior Publication Data

US 2007/0080167 A1 Apr. 12, 2007

Related U.S. Application Data

(60) Provisional application No. 60/709,248, filed on Aug. 18, 2005.

(51) Int. Cl.
*B65D 88/16* (2006.01)
(52) U.S. Cl. ............... 222/100; 222/102; 222/181.2
(58) Field of Classification Search .......... 222/99, 222/100, 101, 102, 181.2
See application file for complete search history.

(56) References Cited

U.S. PATENT DOCUMENTS

| | | | |
|---|---|---|---|
| 438,454 A | 10/1890 | Weeks | |
| 2,542,678 A * | 2/1951 | Keefer | 222/99 |
| 2,602,694 A * | 7/1952 | Richardson | 222/146.4 |
| 2,717,722 A * | 9/1955 | Egler | 222/102 |
| 3,095,206 A * | 6/1963 | Fresia et al. | 222/99 |
| 3,379,251 A | 4/1968 | Bailer | |
| 3,430,815 A * | 3/1969 | Weimer et al. | 222/99 |
| 4,721,397 A | 1/1988 | Knutar | |
| 4,883,201 A * | 11/1989 | Poulton | 222/181.3 |
| 4,998,645 A * | 3/1991 | Pearson | 222/102 |
| 5,025,925 A | 6/1991 | Wiklund | |
| 5,215,218 A * | 6/1993 | Choi | 222/181.2 |
| 5,328,268 A | 7/1994 | Lafleur | |
| 5,333,757 A * | 8/1994 | Volk et al. | 222/181.3 |
| 5,358,335 A | 10/1994 | LaFleur | |
| 5,421,804 A | 6/1995 | LaFleur | |
| 5,511,696 A * | 4/1996 | Gustafson | 222/102 |
| 5,690,253 A | 11/1997 | LaFleur | |
| 5,692,868 A * | 12/1997 | Riemersma | 222/181.2 |
| 5,765,723 A * | 6/1998 | Wilcox | 222/99 |
| 5,765,724 A | 6/1998 | Amberg et al. | |
| 5,833,120 A | 11/1998 | Evans, Sr. et al. | |
| 5,873,498 A * | 2/1999 | Moore et al. | 222/181.2 |

(Continued)

FOREIGN PATENT DOCUMENTS

WO WO 89/07560 8/1989

(Continued)

*Primary Examiner*—Kenneth Bomberg
(74) *Attorney, Agent, or Firm*—The Webb Law Firm

(57) ABSTRACT

A dispensing device and method for dispensing fluids from a flexible container is disclosed. The dispensing device includes a support and a linkage pivotally attached to the support. The dispensing device may also include a roller mechanism coupled to the linkage, wherein the roller mechanism has at least two squeeze members configured to engage a flexible container that coact with a drive roller to force the roller mechanism in a first direction to dispense fluids from a flexible container.

7 Claims, 15 Drawing Sheets

U.S. PATENT DOCUMENTS

| | | |
|---|---|---|
| 6,196,420 B1 | 3/2001 | Gutierrez et al. |
| 6,364,165 B2 | 4/2002 | Sampson et al. |
| 6,374,579 B1 | 4/2002 | Muller |
| 6,547,099 B1 * | 4/2003 | Farris ................... 222/102 |
| 6,637,623 B2 | 10/2003 | Muise et al. |
| 6,637,646 B1 | 10/2003 | Muise et al. |
| 6,659,309 B2 | 12/2003 | Friedman |
| 7,111,758 B1 * | 9/2006 | Monks ................... 222/102 |
| 2004/0094573 A1 | 5/2004 | Danby et al. |

FOREIGN PATENT DOCUMENTS

| | | |
|---|---|---|
| WO | WO 89/07561 | 8/1989 |
| WO | WO 93/06027 | 4/1993 |

* cited by examiner

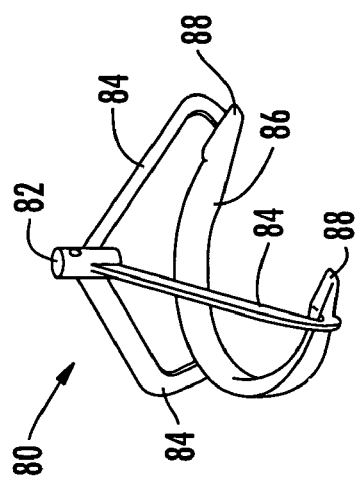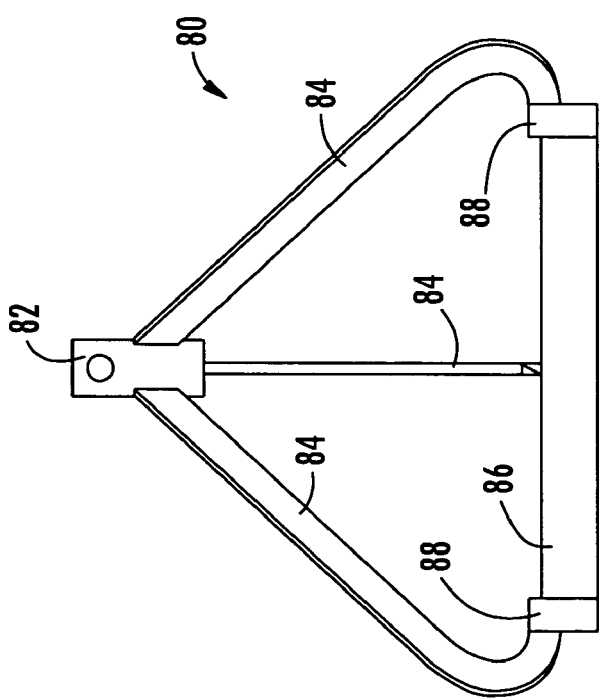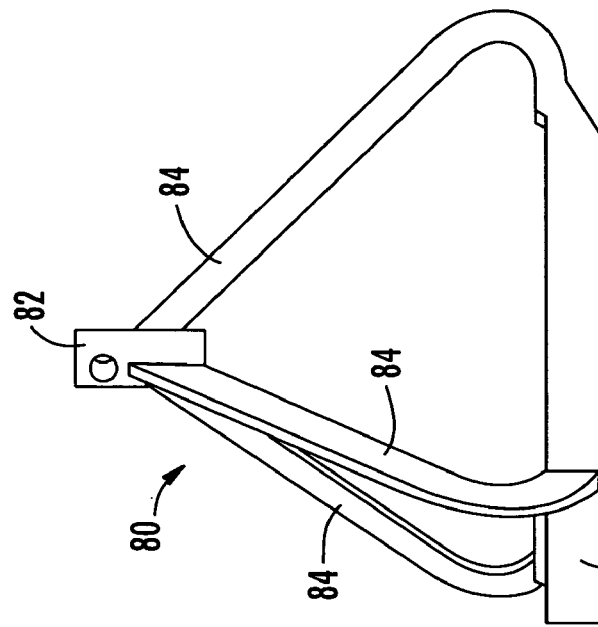

BULK TRANSFER DISPENSING DEVICE AND METHOD

CROSS REFERENCE TO RELATED APPLICATIONS

This application claims the benefit of U.S. Provisional Patent Application No. 60/709,248, filed Aug. 18, 2005 and entitled "BULK TRANSFER DISPENSING DEVICE" which is hereby incorporated by reference in its entirety.

BACKGROUND OF THE INVENTION

1. Field of the Invention

The present invention relates to dispensing devices and methods for dispensing contents from flexible containers and, more particularly, to a dispensing apparatus and method that may be used to dispense fluids.

2. Description of Related Art

Fluids, including semi-fluids, grease, friction modifying materials and other viscous materials, may be stored and shipped in flexible containers adapted to carry hundreds of pounds or more of fluid. These containers may be made from a variety of flexible materials for dispensing the fluids through an outlet of the container. One example of such a container may be found in PCT International Application No. PCT/FI92/00252.

In order to dispense such fluid from such flexible containers, several types of dispensing apparatuses have been developed. Various pump arrangements have been developed to draw the fluid out of the container through the outlet. However, the apparatuses utilizing pumps often are interrupted in the emptying process to prevent air pockets from being created while emptying the container. Further, by pumping out the fluid, waste is problematic in that residual material remains on the walls of the container. In addition, due to the changing viscosity of materials related to changes of temperatures of the external environment, pumping of materials with varying viscosity may require various pumps depending upon the external environment surrounding the container.

Other dispensing apparatuses utilize manual force to force the fluid out of the container through the outlet via rollers. Other roller systems may rely on gravity to allow one or more rollers to squeeze the fluid from the container as gravity acts on the rollers. These devices are typically limited to materials having lower viscosity levels, thus only requiring minimal levels of force to encourage the dispensing of the fluid. Further, many of these dispensing apparatuses are stationary, emptying only the container which may be provided and positioned within the device.

Still other dispensing apparatuses attempt to combine mechanical force via rollers with a pump system. These systems are expensive because of the internal control systems required to allow the rollers and pump to operate in a proper sequence. In addition, specialized outlet tubing and valves may be required to assist the proper removal and rate of removal from the container. Further, these systems are not equipped to be easily maneuvered for operating in environments where strict spatial dimensions may be imposed in which the dispensing apparatus may be required to operate within.

SUMMARY OF THE INVENTION

The present invention provides for a dispensing device for dispensing fluids from a container. The dispensing device includes a support, a linkage pivotally attached to the support, and a dispensing mechanism attached to the linkage having at least two squeeze members that coact to engage a container, wherein the dispensing mechanism is configured to dispense fluid from a container.

The present invention includes a dispensing system for dispensing fluid from a container. The dispensing system includes a dispensing device and a pump configured to coact with the dispensing device and configured to remove fluid from a container. The dispensing device includes a support, a linkage pivotally attached to the support and a dispensing mechanism attached to the linkage having at least two squeeze members that coact to engage a container, wherein the dispensing mechanism is configured to dispense fluid from a container.

The present invention also provides for a dispensing device for dispensing fluids from a container. The dispensing device includes a support, a linkage pivotally attached to the support, and a roller mechanism attached to the linkage. The roller mechanism includes at least one squeeze member configured to engage a container and coact with a drive roller to move the roller mechanism in a first direction to dispense fluid from a container.

The present invention further provides for a method of dispensing fluids from a container including providing a container having fluid contained therein. The method also includes providing a dispensing device having a support, a linkage pivotally attached to the support, a holder attached to the dispensing device and configured to engage a container, and a roller mechanism positioned on the linkage. The method further includes securing the holder to a container, engaging a container with the roller mechanism, and actuating the roller mechanism to force the roller mechanism in a first direction to dispense fluid from a container.

BRIEF DESCRIPTION OF THE DRAWINGS

FIG. 11 is a perspective view of a holder according to the present invention;

FIG. 12 is a front elevation view of the holder shown in FIG. 11;

FIG. 13 is a rear side elevation view of the holder shown in FIG. 11;

DETAILED DESCRIPTION OF THE INVENTION

Figure 1:
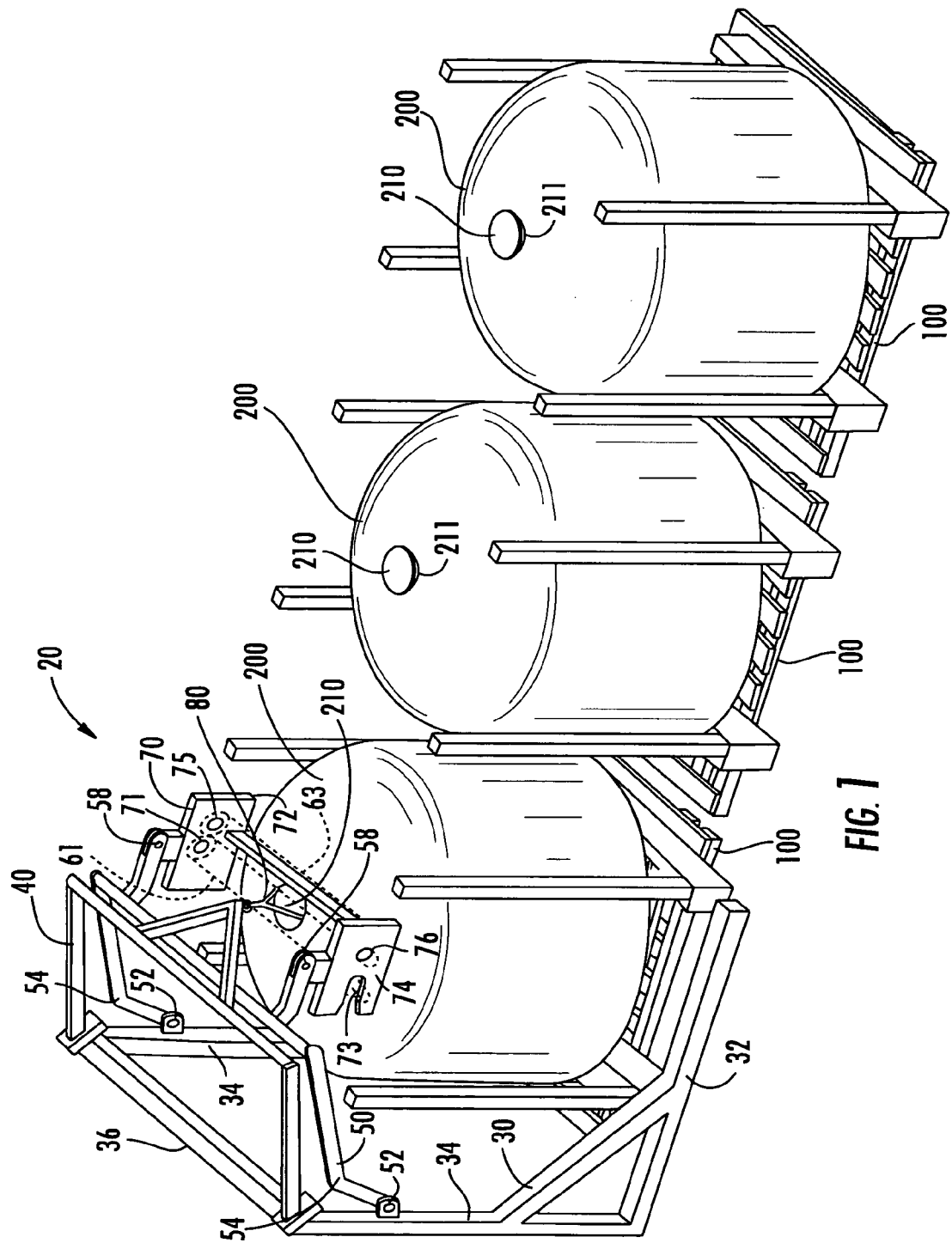
FIG. 1 is a perspective view of a first embodiment of a support structure for a dispensing device according to the present invention as it may be positioned for use with a container.

For purposes of the description hereinafter, the words "upper", "lower", "right", "left", "vertical", "horizontal", "top", "bottom", "lateral", "longitudinal" and like spatial terms, if used, shall relate to the described embodiments as oriented in the drawing figures. However, it is to be understood that many alternative variations and embodiments may be assumed except where expressly specified to the contrary. It is also to be understood that the specific devices and embodiments illustrated in the accompanying drawings and described herein are simply exemplary embodiments of the invention.

The present invention, e.g., a first embodiment, provides for a dispensing device 10 that has a support structure 20. Like reference numerals will be used for like elements. The support structure 20 may be positioned about a pallet 100 that supports a flexible container 200. More than one flexible container 200 may be positioned in a queue for emptying by the dispensing device 10. One such flexible container is the FLUID-BAG FLEXI™ container provided by Fluid-Bag Ltd. of Bottenviksvägen 54-56, FI-68600 Jakobstad, Finland.

As shown in FIG. 1, a support 30, has a base 32 supported on the ground. Extending generally in an orthogonal direction away from the base 32 are upright members 34. A cross member 36 may connect the upright members 34 to form an upright portion of the support 30. A support extension 40 is attached to an upper end of the support 30 and may support a holder 80 at a distal end of the support extension 40. The holder 80 may be positioned on a lid 210 of the flexible container 200 for securing the flexible container 200 while being emptied by the dispensing device 10. The support 30 also includes a linkage 50 that may be pivotally supported on the support 30 at a proximal end below the support extension 40.

Figure 22:
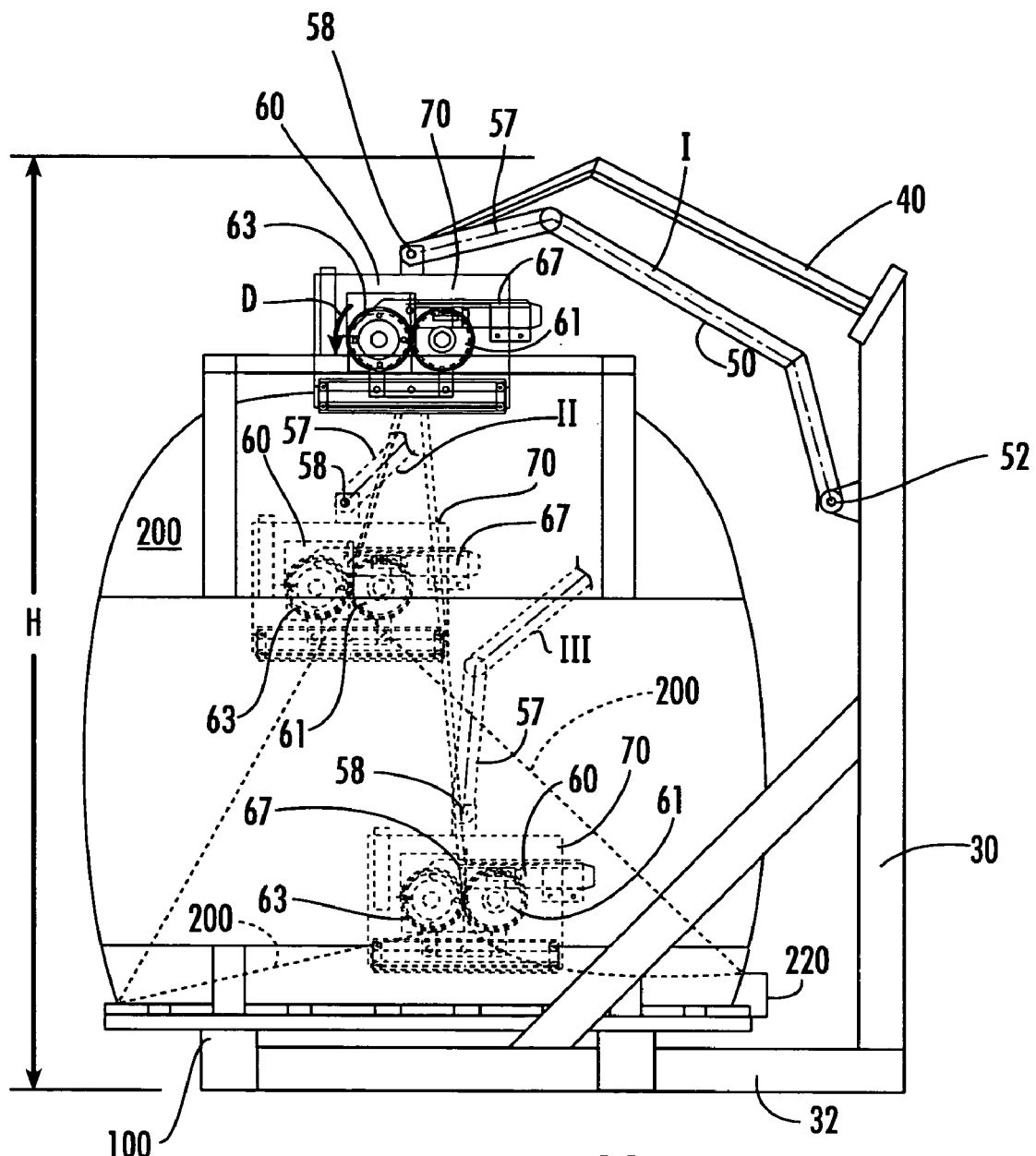
FIG. 22 is a side elevation view of the first embodiment of the dispensing device according to the present invention illustrating its range of motion as it dispenses fluid.

A dispensing mechanism support 70 may be pivotally attached to a distal end of the linkage 50. Dispensing mechanism support 70 may be used to support a dispensing mechanism 60 as illustrated in FIG. 22, for example, and shown in phantom in FIG. 1. Accordingly, dispensing mechanism support 70 may be provided with a first mounting bore 71 formed in a first plate 72 and a mounting slot 73 formed in a second plate 74 to receive a first roller 61 as illustrated in FIG. 22. The mounting slot 73 provides structure for allowing the first roller 61 to be in a locked state and to further allow the first roller 61 to pivot a limited amount about first mounting bore 71. Such pivotal movement may be necessary to engage the flexible container 200 below the lid 210 as will be discussed in greater detail below. Further, a second mounting bore 75 may be formed in the first plate 72 while a third bore 76 may be formed in the second plate 74, opposite the second mounting bore 75, for receiving a second roller 63. Thus, the dispensing mechanism support 70 may provide structure for supporting a first set of rollers 62 including the first and second rollers 61, 63.

Figure 3:
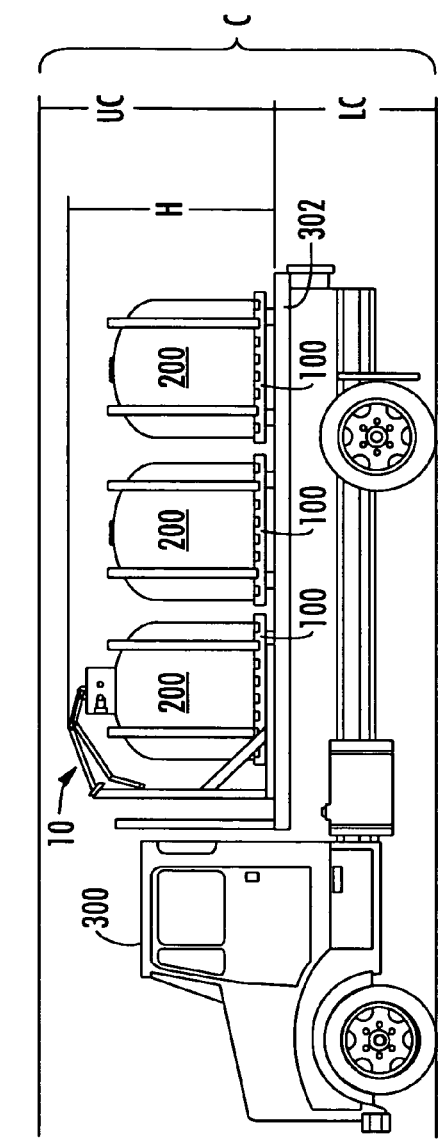
FIG. 3 is a side elevation view of FIG. 2 as it may be employed on a vehicle.

The fixed connection between support extension 40 and support 30, along with the downwardly pivotal connections of the linkage 50 between the support 30 and the dispensing mechanism support 70, allow the dispensing device 10 to operate within limited spatial dimensions, which may be required in use with various transportation systems such as, for example, a clearance C as shown in FIG. 3.

Figure 2:
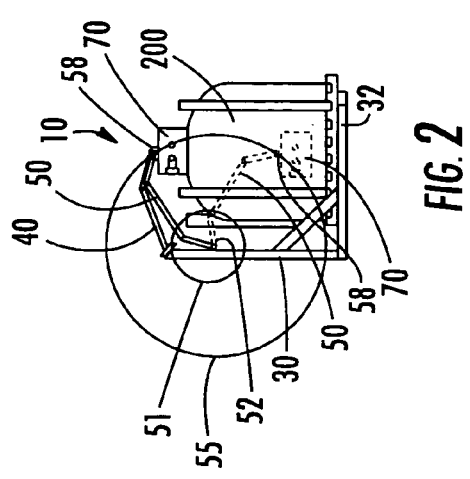
FIG. 2 is a side elevation view of a dispensing device according to the present invention illustrating its range of motion.
Figure 5:
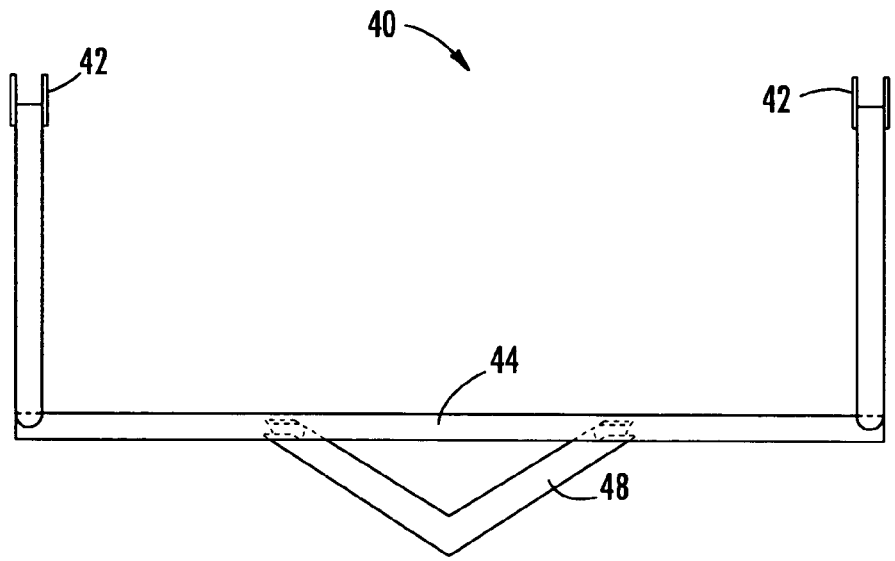
FIG. 5 is a top plan view of a support extension according to the present invention as viewed orthogonal to a plane defined by a C-shaped member.
Figure 6:
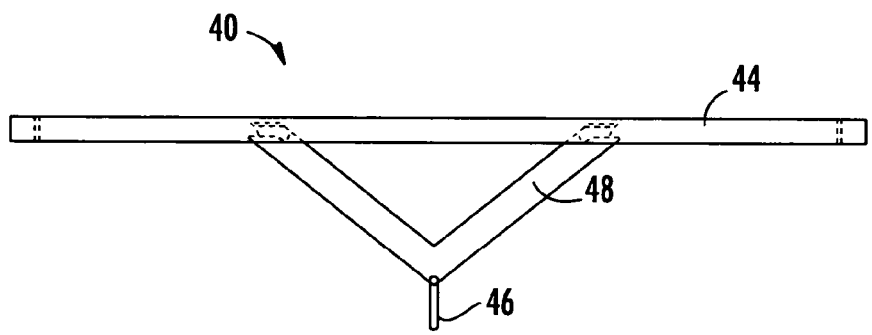
FIG. 6 is a rear elevation view of the support extension shown in FIG. 5.
Figure 7:
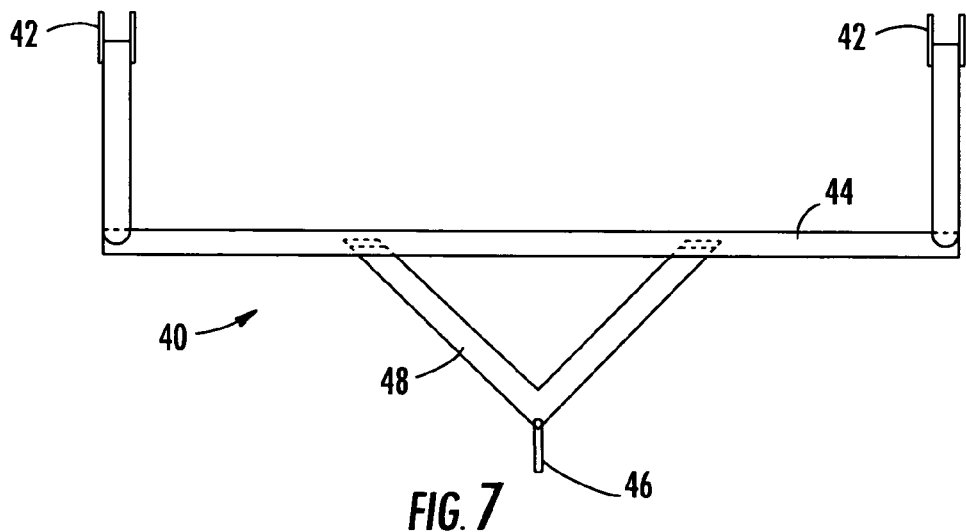
FIG. 7 is a top plan view of the support extension shown in FIG. 5 as viewed orthogonal to a plane defined by a hanger member.
Figure 8:
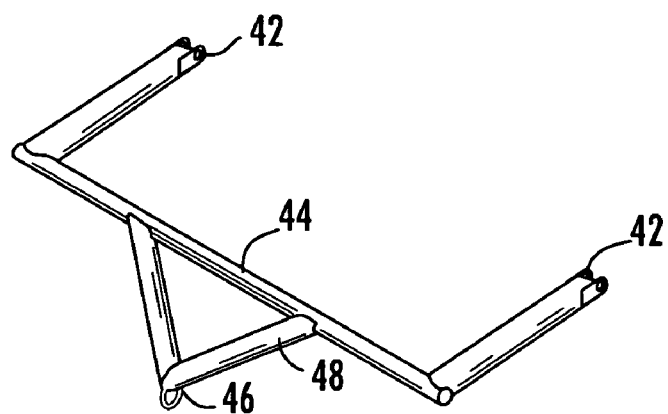
FIG. 8 is a perspective view of the support extension shown in FIG. 5.
Figure 9:
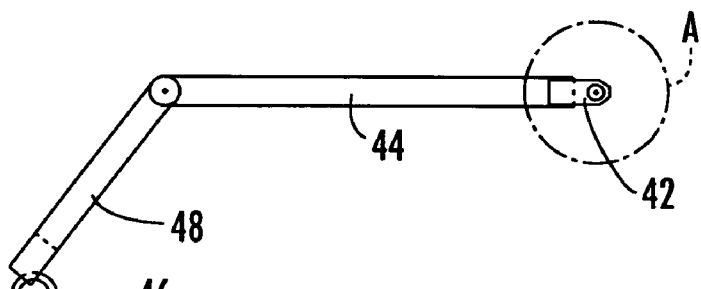
FIG. 9 is a side elevation view of the support extension shown in FIG. 5.
Figure 10:
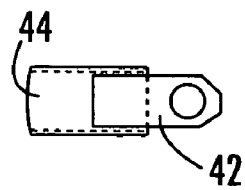
FIG. 10 is an enlarged view of section A in FIG. 9.
Figure 14:
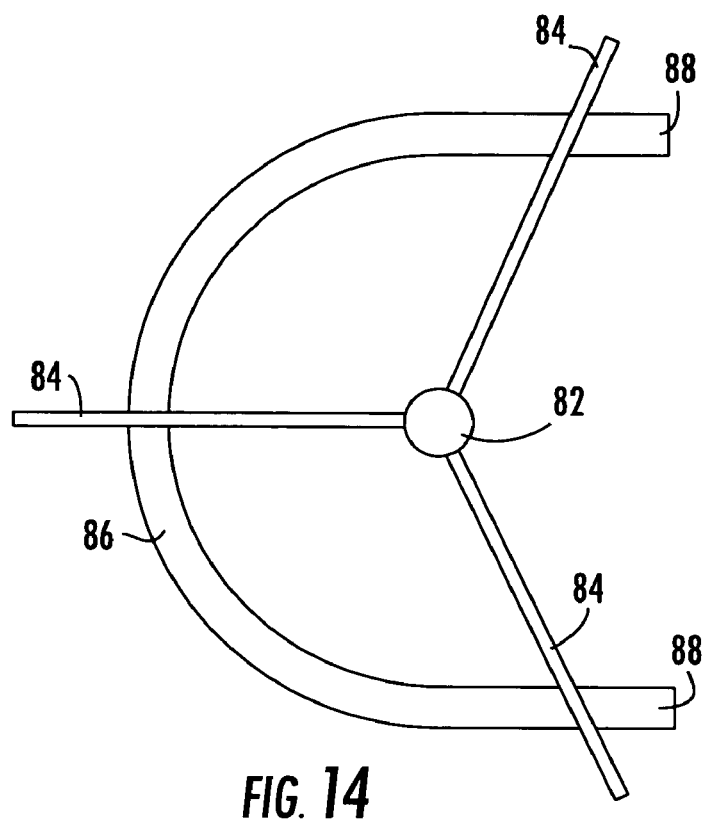
FIG. 14 is a top plan view of the holder shown in FIG. 11.
Figure 15:
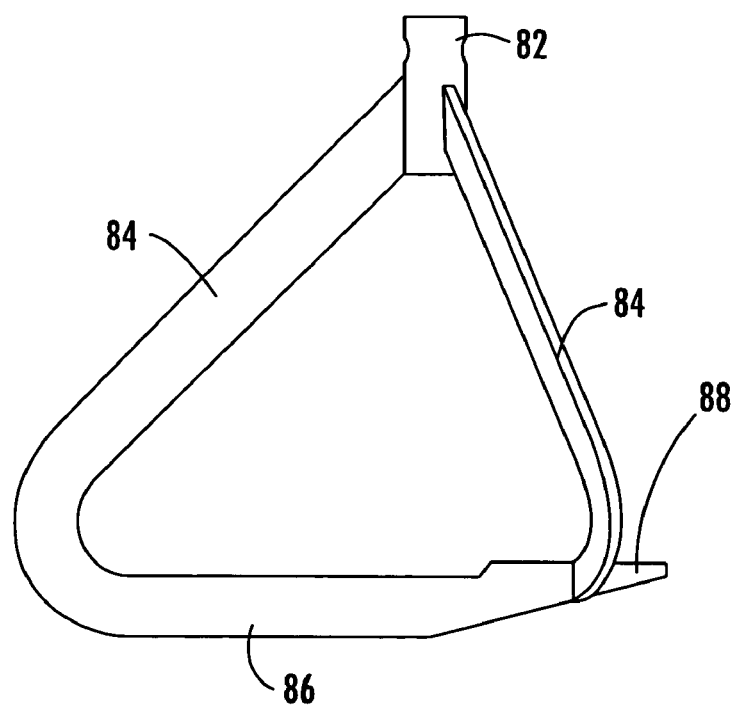
FIG. 15 is a side elevation view of the holder shown in FIG. 11.
Figure 16:
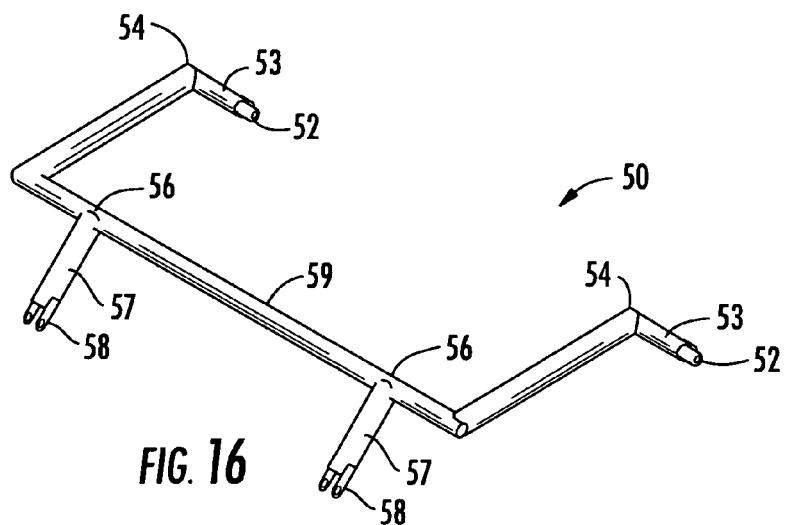
FIG. 16 is a perspective view of a linkage according to the present invention.
Figure 17:
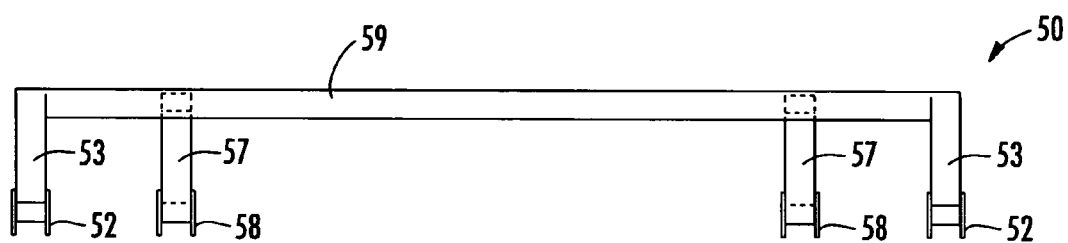
FIG. 17 is a rear elevation view of the linkage shown in FIG. 16.
Figure 18:
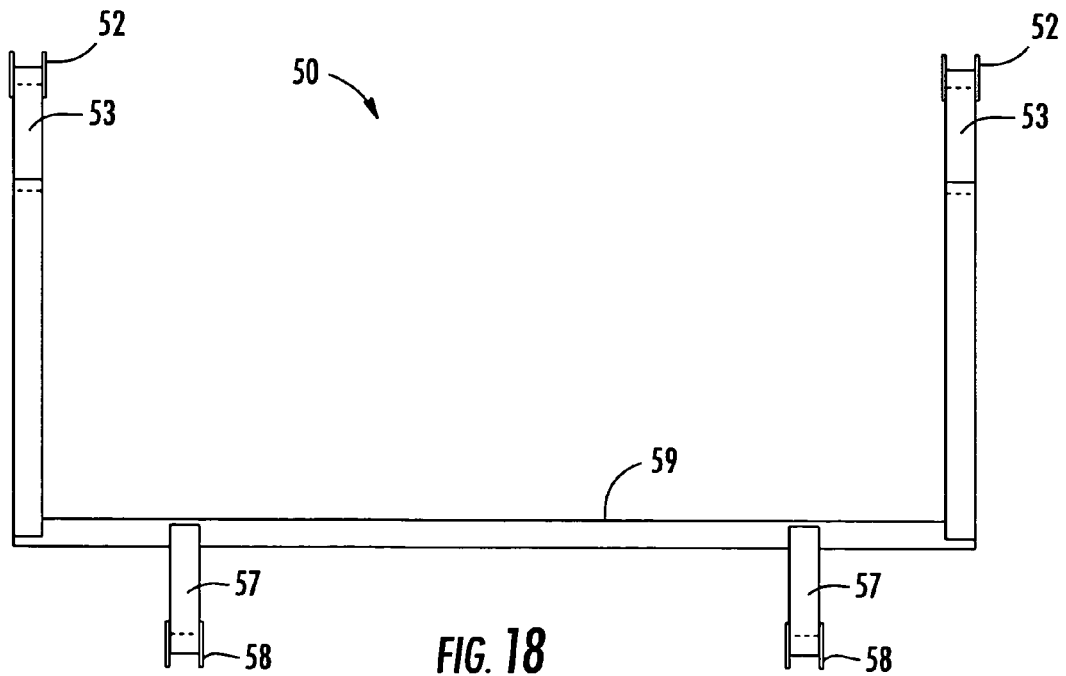
FIG. 18 is a top plan view of the linkage shown in FIG. 16.
Figure 19:
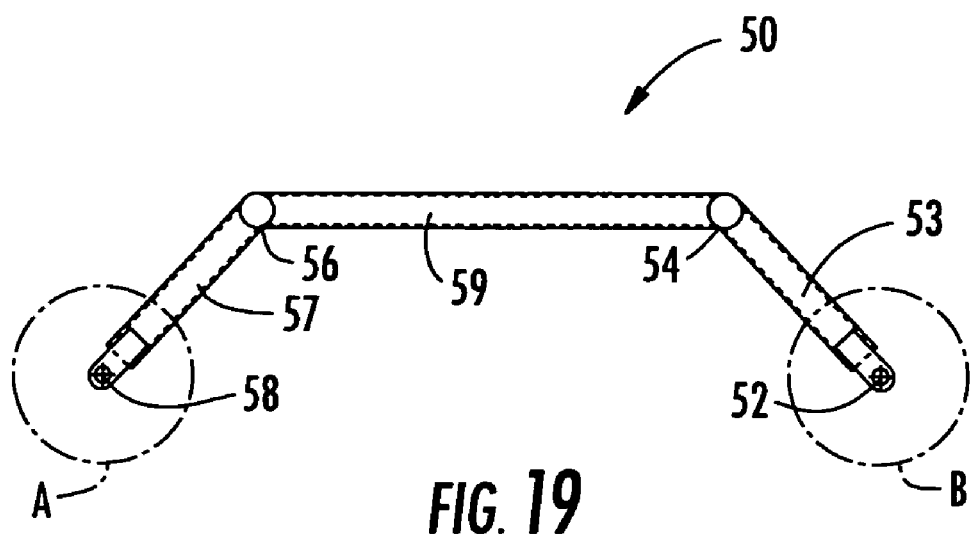
FIG. 19 is a side elevation view of the linkage shown in FIG. 16.
Figure 20:
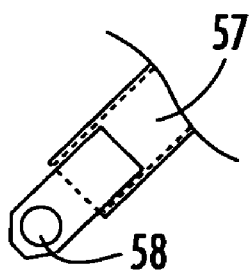
FIG. 20 is an enlarged view of section A in FIG. 19.
Figure 21:
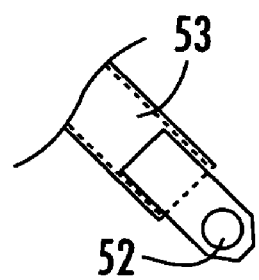
FIG. 21 is an enlarged view of section B in FIG. 19.

FIG. 2 generally illustrates the range of motion that the linkage 50 may provide the dispensing device 10 as it moves through the emptying process. As shown in FIGS. 2 and 16-19, a first revolute path 51 may be defined by a first revolute joint 52 at the pivotal attachment between the linkage 50 and the support 30. The outer extremity of first revolute path 51 may be defined by a first bend 54 on the linkage 50. A second revolute path 55 may be defined by the first revolute joint 52 at the pivotal attachment between the linkage 50 and the support 30. The outer extremity of second revolute path 55 may be defined by a second revolute joint 58 at the pivotal attachment between the linkage 50 and the dispensing mechanism support 70. These revolute paths 51, 55 allow the dispensing device 10 to maneuver itself from the upper end of the flexible container 200 to the lower end of the flexible container 200 as it is emptied by the dispensing device 10.

Figure 4:
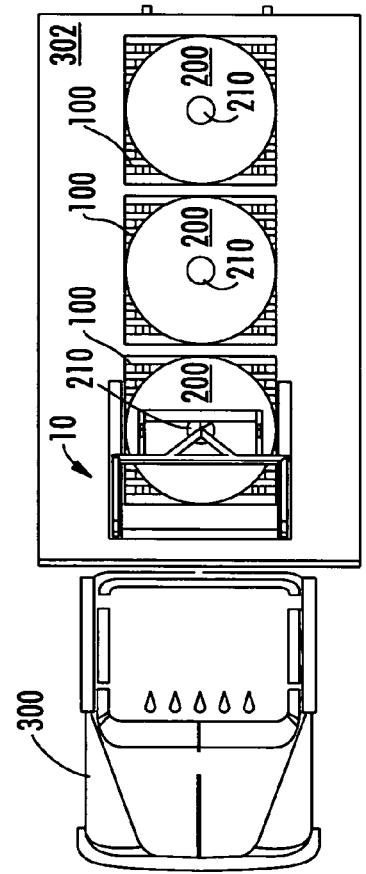
FIG. 4 is top plan view of FIG. 3.

FIGS. 3 and 4 illustrate a wheeled or movable transport vehicle 300, such as a truck, having a support surface 302. The support surface 302 may support pallets 100 holding containers 200, positioned such that the dispensing device 10 may empty at least one flexible container 200. As shown in FIG. 3, a total clearance C may be imposed upon the transport vehicle 300 in order to prevent damage to overhead structures in which the transport vehicle 300 may pass under. The total clearance C may be ten feet, for example, as will be defined to suit the given application and/or controlling regulations and laws. A lower clearance LC may be defined by the distance between the road and the top surface of the support surface 302, which is commonly four feet in these types of applications although other lower clearances LC may be defined. Subtracting the lower clearance LC from the total clearance C provides an upper clearance UC, which is six feet in this instance. Thus, a height H of the dispensing device 10 less than the upper clearance UC, which is six feet in this instance, will allow the dispensing device 10 and the containers 200 to be safely transported. It will also be noted that the dispensing device 10 can readily operate below the upper clearance UC due to the positioning of the revolute joints 52, 58 of the linkage 50.

FIGS. 5-10 show the support extension 40 in greater detail in accordance with one embodiment of the present invention. The support extension 40 may have brackets 42 attaching the support extension 40 to the support 30. The brackets 42 are positioned at terminal ends of a C-shaped member 44. Along the distal end of the C-shaped member from the brackets 42, a hanger member 48 may be positioned thereon having an attachment member 46 attached to the hanger member 48. Although attachment member 46 is illustrated as a ring, it will be understood that other attachments may be employed in lieu of attachment member 46 in accordance with the present invention such as, for example, a hole positioned in hanger member 48. The hanger member 48 may be triangular in shape or other configuration suitable for the given application. The support extension 40 may be positioned in a fixed manner such that when the dispensing device 10 is in operation, the lid 210 of the flexible container 200 may remain in a stable position.

The holder 80 is illustrated in FIGS. 11-15. As shown, an attachment portion 82 of the holder 80 is positioned above and attached to stays 84. The attachment portion 82 may be attached to the attachment member 46 of the support extension 40 when in use. The stays 84 may extend downward and outwardly from the attachment portion 82 and may also be attached to a lid engagement portion 86. The lid engagement portion 86 may be used to engage the lid 210 of the flexible container 200. The configuration of the lid engagement portion 86 may be configured to varying sizes and shapes of lids such as, for example, lid 210 depending upon the application. However, in the present embodiment, the lid engagement portion 86 is configured in a C-shape having wedge portions 88 for positioning under the lid 210 in a recess 211 and allowing engagement for securing the upper portion of the flexible container 200 by the lid 210.

FIGS. 16-21 depict the linkage 50 in greater detail. First extension members 53 may pivotally attach to the support 30 below the support extension 40 to permit the linkage 50 to rotate and operate beneath the support extension 40 and thus, below the upper clearance UC. In other embodiments, as will be discussed in greater detail below, other mechanisms to secure the lid 210 may be employed which would not require the use of support extension 40. The attachment between the support 30 and the linkage 50 via the first extension members 53 may define the first revolute joints 52. The first extension members 53 may be integrally attached to a C-shaped member 59 of the linkage 50 along the length of the C-shaped member 59. The place where the first extension members 53 attach to the C-shaped member 59 defines the first bend 54 discussed above. The C-shaped member 59 may attach to the first extension members 53 at an angle to a plane defined by the C-shaped member 59. Likewise, the terminal ends of the C-shaped member 59 may be integrally attached to second extension members 57 at an angle to the plane defined by the C-shaped member 59. The place where the second extension members 57 intersect with the C-shaped member 59 defines a second bend 56. The second extension members 57 may also be pivotally attached to the dispensing mechanism support 70, as illustrated in FIG. 1, and thus define second revolute joints 58. With the provision of second revolute joints 58, the dispensing mechanism 60 is provided with the ability to rotate with respect to the second extension members 57 and thus remain in a position creating the least strain on the second revolute joints 58.

FIG. 22 illustrates the first embodiment of the dispensing device 10 having the dispensing mechanism 60 positioned in the dispensing mechanism support 70 above the flexible container 200. The first set of rollers 62 of the dispensing mechanism 60 may engage the flexible container 200 in the recess below the lid 210 in order to dispense the contents of the flexible container 200. Accordingly, the support extension 40 will define the maximum height H that will be attained through the dispensing process. This is desirable where the dispensing device 10 is required to be mobile and transported between locations for multiple dispensing sites while remaining beneath any required clearance C.

As can be seen in FIG. 22, three positions are illustrated wherein a starting position I illustrates the dispensing mechanism 60 positioned above the flexible container 200 ready to be engaged for emptying the flexible container 200. Accordingly, the first set of rollers 62 may be positionable manually so as to permit someone employing the dispensing device 10 to pivot the first roller 61 out of the mounting slot 73 in order to have the flexible container 200 positioned between the first set of rollers 62. More specifically, the first roller 61 may be pivoted about the first mounting bore 71 to disengage the mounting slot 73 of the dispensing mechanism support 70, shown in FIG. 1. The first set of rollers 62, including the first and second rollers 61, 63, are then positioned below the lid 210. The first roller 61 is returned into the mounting slot 73 below the lid 210 in the recess 211, thus engaging the dispensing mechanism 60 with the flexible container 200. Other embodiments may include automatically engaging the first set of rollers 62 together. By engaging the first set of rollers 62 together with the flexible container 200 positioned between them, the first and second rollers 61, 63 may coact to squeeze the fluid out of the flexible container 200 by activating an actuator 67 to drive the second roller 63. The actuator 67 may be controlled manually or remotely by means of a control panel (not shown) to regulate the dispensing process. Alternatively, both the first and second rollers 61, 63 could be driven if desirable for a given application. Further, although the dispensing mechanism 60 is illustrated as having rollers 61, 63, other squeeze members may be implemented to force material out of the flexible container 200 such as, for example, a square or rectangular bar configuration.

As can be seen in FIG. 22, the dispensing mechanism 60 may be implemented to create a dispensing force as the walls of the flexible container 200 are pressed together and the dispensing mechanism 60 pulls itself in a downward direction away from the lid 210, suspended by the holder 80, and toward the base 32. As mentioned above, one or both of the first and second rollers 61, 63 may be powered by a motor such as, for example, actuator 67, to drive the dispensing mechanism 60 toward the base 32. Accordingly, the second roller 63 may be driven by activating the actuator 67 such that the second roller is rotated in the counter-clockwise direction D. Thus, as the first set of rollers 62 drives the dispensing mechanism 60 downward while the flexible container 200 is drawn upward through the first set of rollers 62, the dispensing mechanism 60 will pivot about the first revolute joint 52 as illustrated in an intermediate position II in FIG. 22. Thus, as the rollers 62 progress downwardly into the intermediate position II the fluid in the flexible container 200 will be forced out of an outlet 220 of the flexible container 200 until reaching the bottom of the flexible container 200 as shown in an ending position III wherein the maximum height H is not exceeded throughout the dispensing process. Accordingly, the flexible container 200 may be deformed while secured to holder 80 as shown in phantom in the intermediate position II and the ending position III. It is understood that the material in the container described as a fluid may include semi-fluids, grease, friction modifying materials or other viscous materials.

FIGS. 23-27 illustrate a second embodiment of a dispensing device 110 having a dispensing mechanism 160 positioned on a dispensing mechanism support 170 above the flexible container 200 and supported by a support 130. More than one flexible container 200 may be positioned in a queue for emptying by the dispensing device 110. Further, the dispensing device 110 may also be mounted on a wheeled or movable transport vehicle, such as a truck, in a similar fashion as illustrated in FIGS. 3 and 4, and can be readily operated below the required clearances.

Figure 23:
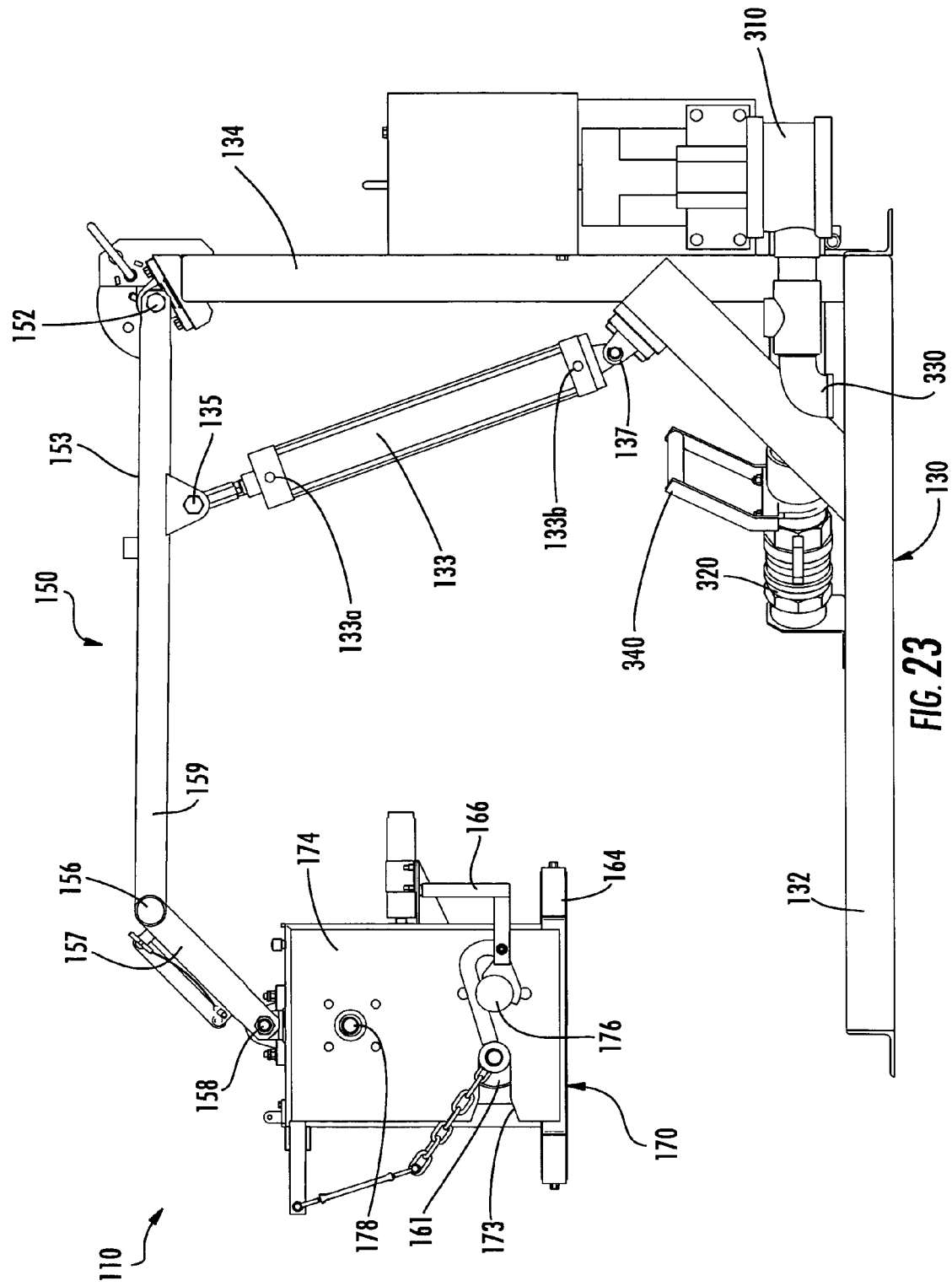
FIG. 23 is a side elevation view of a second embodiment of the dispensing device according to the present invention.
Figure 24:
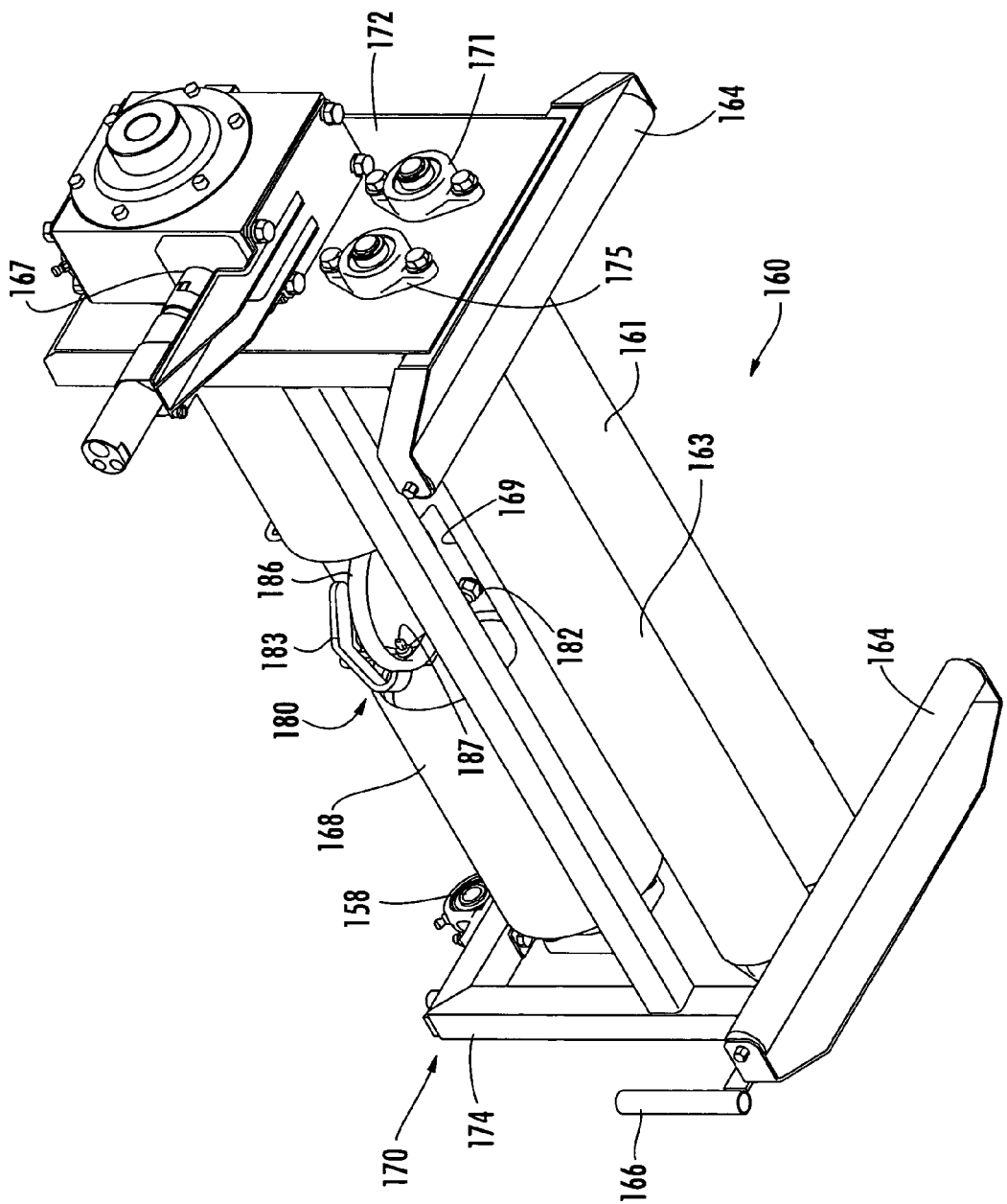
FIG. 24 is a perspective view of a dispensing mechanism support having a dispensing mechanism positioned therein according to the present invention.
Figure 26:
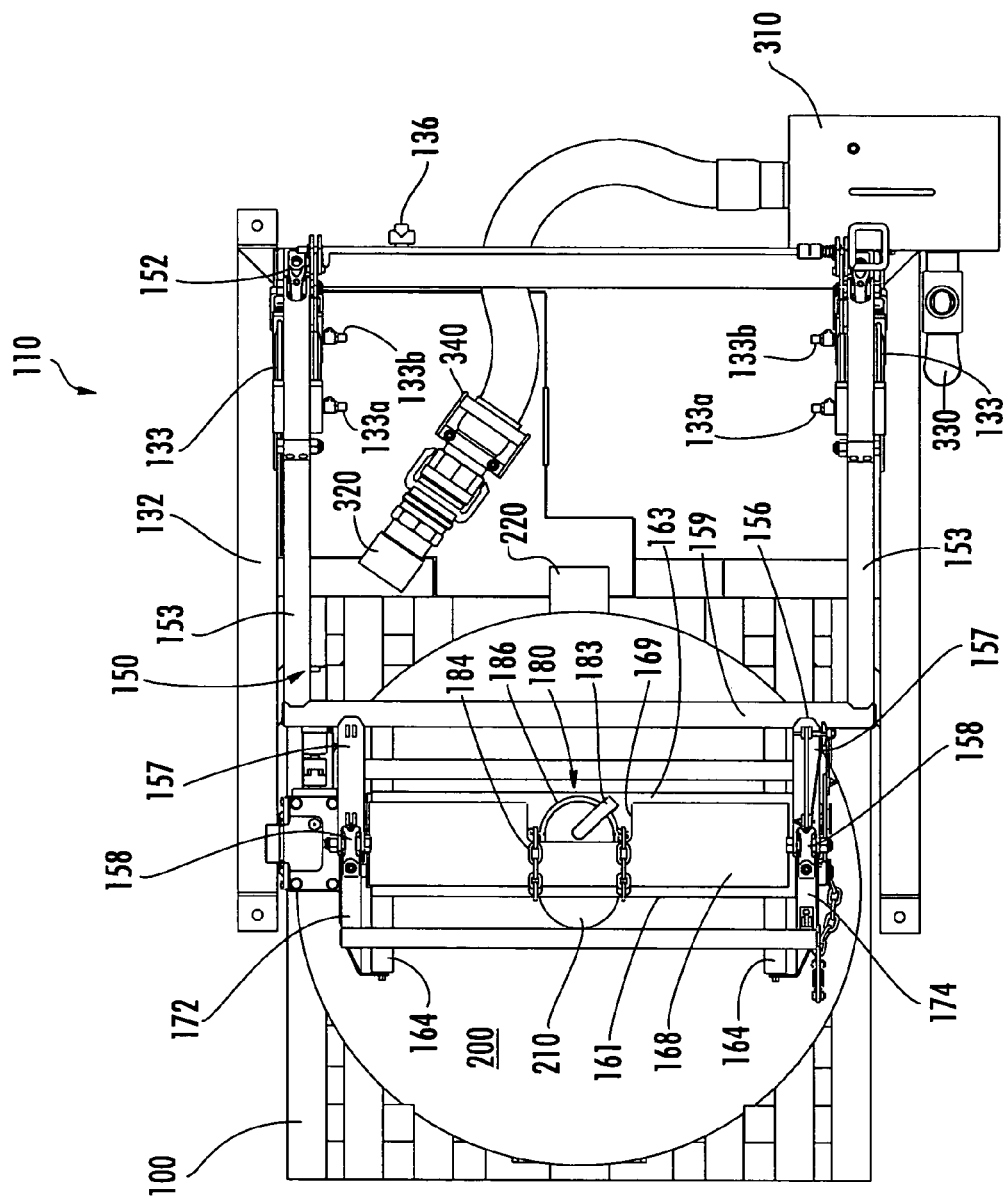
FIG. 26 is a top plan view of FIG. 25.

As shown in FIGS. 23, 24 and 26, the support 130 may have a base 132 and upright members 134 extending generally in an orthogonal direction away from the base 132. A cross member 136 may be provided attaching the upright members 134 of the support 130. In addition, the support 130 may also include at least one actuator 133 for manipulating a linkage 150 pivotally supported on the support 130. The actuator 133 may also be pivotally attached to linkage 150 at a first pivot 135 and be pivotally attached to the support 130 at a second pivot 137. The actuator 133 may be extended and/or retracted by the supply of fluids communicating with a first and second port 133a, 133b of the actuator 133. Accordingly, by introducing fluid into second port 133b, the actuator 133 may be extended where fluid is permitted to exit first port 133a. Conversely, by introducing fluid into first port 133a, or simply exhausting fluid out of second port 133b, the actuator 133 may be retracted. Thus, the linkage 150 is permitted to move in a direction away from the base 132 when the dispensing device 110 is deactivated, moving the dispensing mechanism 160 upward. Alternatively, when the dispensing device 110 is activated, the actuator 133 may be deactivated to permit fluids to evacuate through the second port 133b to allow the dispensing device to move in a first direction toward the base 132.

Figure 25:
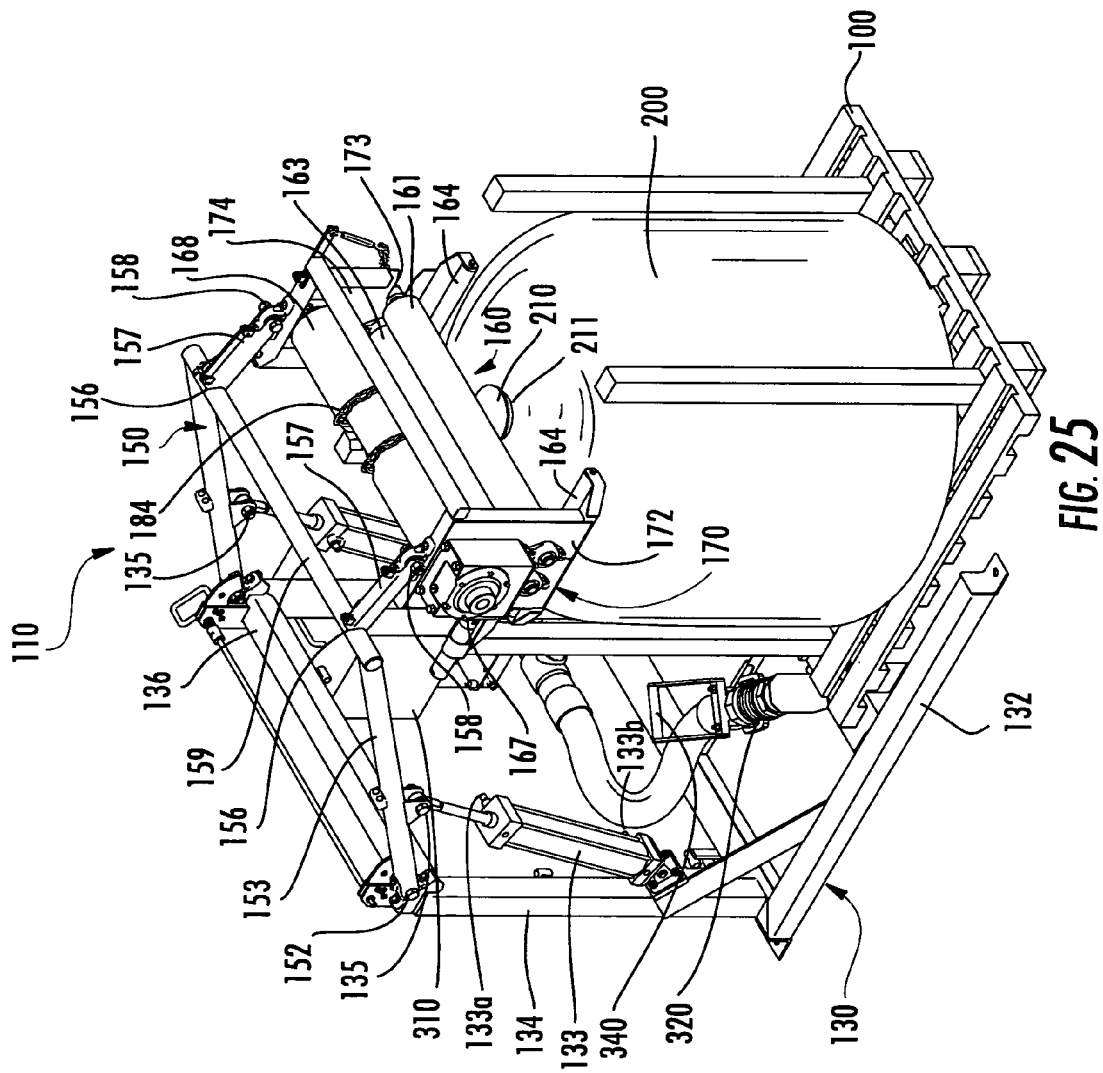
FIG. 25 is a perspective view of the second embodiment of the dispensing device as it may be positioned relative to a container for dispensing according to the present invention.
Figure 27:
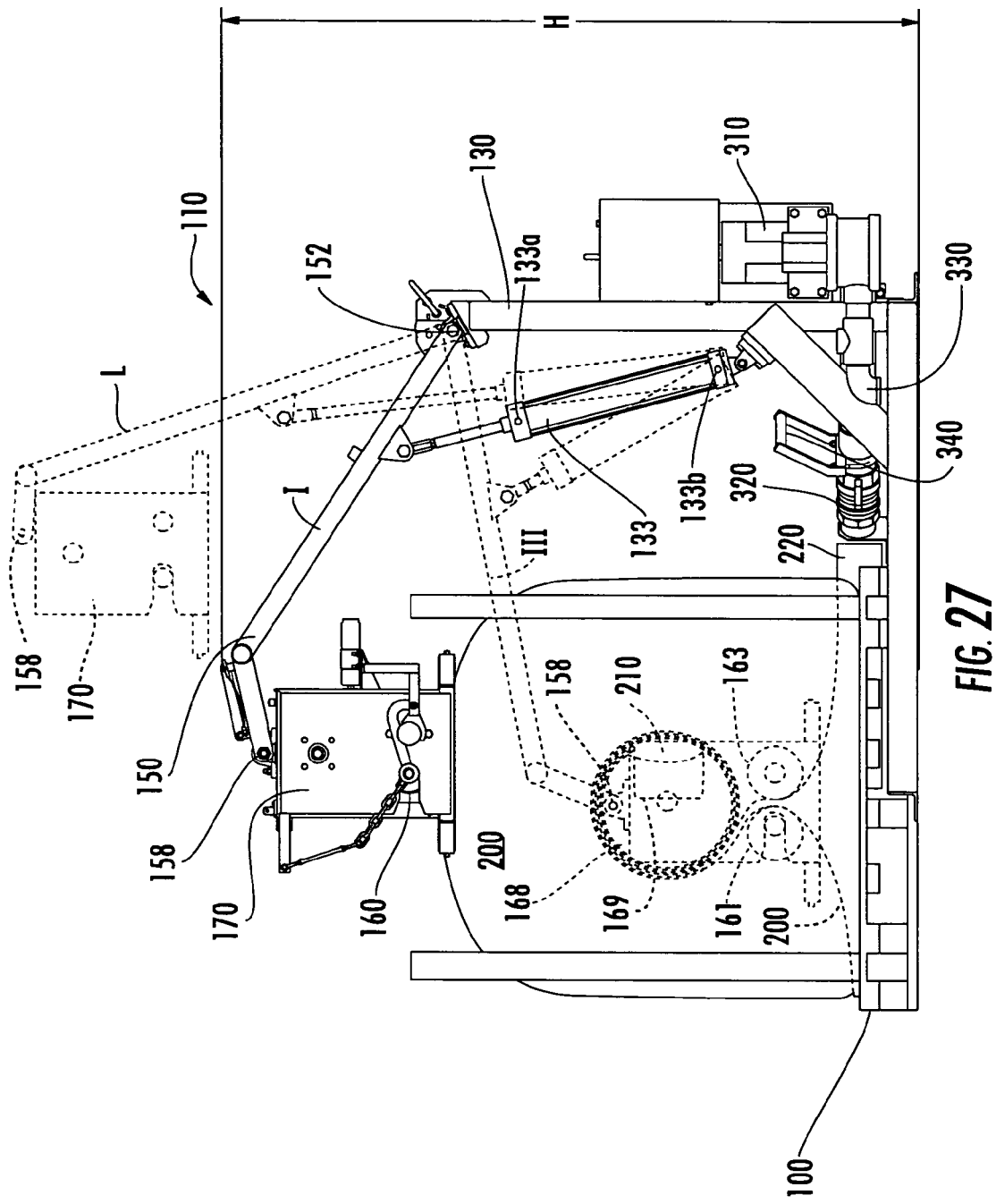
FIG. 27 is a side elevation view of the second embodiment of the dispensing device according to the present invention illustrating its range of motion as it dispenses fluid from a container.

The linkage 150 of the second embodiment may be provided in a similar fashion to linkage 50 described above in the first embodiment. As shown in FIGS. 23, 25 and 26, first extension members 153 may pivotally attach to the support 130 to permit the linkage 150 to rotate and operate beneath the any required clearances as discussed above. The attachment between the support 130 and the linkage 150 via the first extension members 153 may define first revolute joints 152. The first extension members 153 may attach with a third extension member 159 forming a C-shaped configuration of the linkage 150. The third extension member 159 may further attach to second extension members 157, defining bends 156. As can be seen in FIG. 23, the third extension member 159 may attach to the second extension members 157 at an angle to a plane defined by the first and third extension members 153, 159. Second extension members 157 may also be pivotally attached to the dispensing mechanism support 170, as illustrated in FIGS. 23, 25 and 27, and thus define second revolute joints 158. With the provision of second revolute joints 158, the dispensing mechanism 160 is provided with the ability to rotate with respect to the second extension members 157 and thus remain in a position creating the least strain on the second revolute joints 158 and the bends 156.

The dispensing mechanism support 170 may be pivotally attached to a distal end of the linkage 150 at the second revolute joint 158. Dispensing mechanism support 170 may be used to support a dispensing mechanism, such as a dispensing mechanism 160, as illustrated in FIG. 24, for example. The dispensing mechanism support 170 may be provided with a first mount 171 formed in a first plate 172. A mounting slot 173 may be formed in a second plate 174 opposite the first mount 171 to receive a first roller 161 of the dispensing mechanism 160, as illustrated in FIGS. 23 and 24. The mounting slot 173 provides structure for allowing the first roller 161 to be in a locked state and to further allow the first roller 161 to pivot a limited amount about first mount 171. Further, a second mount 175 may be formed in the first plate 172 while a third mount 176 may be formed in the second plate 174, opposite the second mount 175. Thus, the second and third mounts 175, 176 may receive a second roller 163 of the dispensing mechanism 160. Thus, the dispensing mechanism support 170 may provide structure for supporting the first and second rollers 161, 163. Although rollers 161, 163 are shown as having a cylindrical shape, other configurations may be provided in order to dispense the fluid from the flexible container 200 such as, for example, a square or rectangular bar configuration.

The dispensing mechanism 160 may additionally employ a drive roller 168 above or spaced apart a distance from the first and second rollers 161, 163. The drive roller 168 may be attached to the dispensing mechanism support 170 on the second plate 174 by fourth mount 178 and on the first plate 172 by an actuator 167 such as, for example, a motor. The actuator 167 may be controlled manually or remotely by means of a control panel (not shown) to regulate the dispensing process. The drive roller 168 may further be implemented to engage the flexible container 200 for dispensing fluid from the flexible container 200. More specifically, a holder 180 may be employed to attach to the lid 210 of the flexible container 200. The holder 180 may be positioned in a recess 169 of the drive roller 168 to prevent unnecessary interference with the flexible container 200 while in use.

Figure 24A:
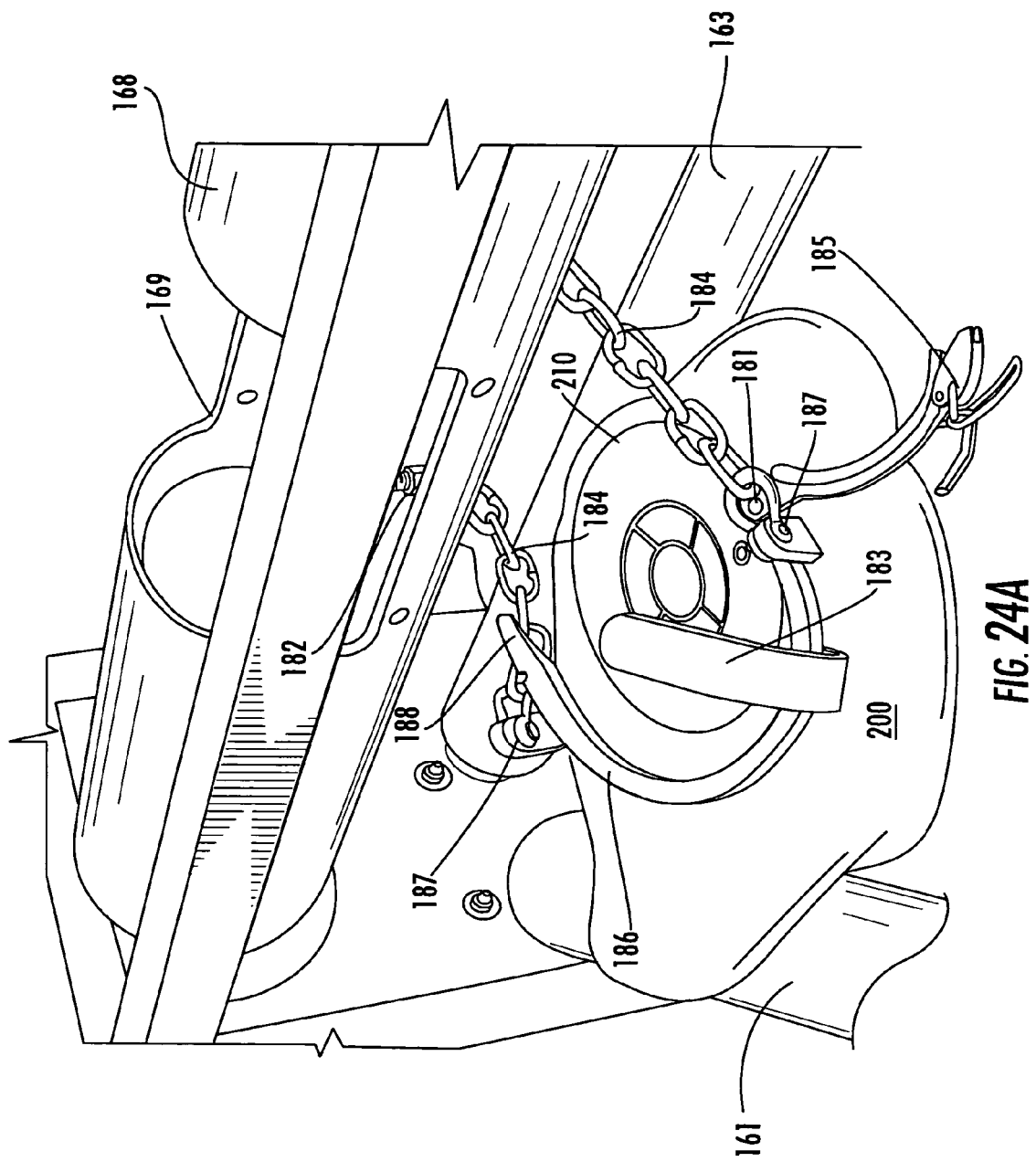
FIG. 24A is a perspective view of a holder attached to a drive roller according to the present invention.

The holder 180 is shown in FIGS. 24, 24A and 26, and includes an attachment portion 182 attaching the drive roller 168 to the extensions 184. Although extensions 184 are shown as chains in the drawings, other extensions may be contemplated within the scope of the invention including, but not limited to, cables, ropes, etc. The holder 180 further has a lid engagement portion 186. The extensions 184 attach to the lid engagement portion 186 by fasteners 187, such that it may be positioned in various orientations for securing to the lid 210 by engaging the recess 211. Although fasteners 187 are shown as clevises, other attachments may be used such as, for example, welding, etc. within the scope of the present invention. Further, the attachment engagement portion 186 may be reconfigurable via a hinge 181, or otherwise, to allow the lid engagement portion 186 to secure the lid 210 of the flexible container 200. The lid engagement portion 186 also has wedge portions 188 to encourage the lid engagement portion 186 to secure the lid 210 by engaging the recess 211 under the lid 210. In the second embodiment shown, a holding member 183 may be employed to assist in positioning lid engagement portion 186 in a secure position after it has been hinged open and placed about the lid 210. Once the holder 180 is secured in the recess 211, a clamp 185 may be secured to the lid engagement portion 186 to lock the holder 180 in place. The configuration of the lid engagement portion 186 may be configured to varying sizes and shapes of lids such as, for example, lid 210 depending upon the application. However, in the present embodiment, the lid engagement portion 186 is configured in a hinged O-ring configuration for securing the upper portion of the flexible container 200 by the lid 210 in the recess 211.

Once the holder 180 is attached to the lid 210 of the flexible container 200, the drive roller 168 may be actuated by actuator 167 mounted to the first plate 172. Thus, the lid 210 will be pulled toward the drive roller 168 as the extensions 184 wrap around the drive roller 168. This initial pulling of the lid 210 should cause the flexible container 200 to take on a somewhat tear-shaped configuration. This configuration may provide an adequate configuration for securing the dispensing mechanism 160 beneath the lid 210. The first roller 161 may be pivoted open out of the mounting slot 173 allowing the lid 210 to be raised between the first and second rollers 161, 163. The first roller 161 may then be manually forced together having the flexible container 200 positioned between the first and second rollers 161, 163 below the lid 210.

In order to maintain the first roller 161 in the mounting slot 173 in order to keep the first and second rollers 161, 163 in an engaged position so that they may exert a mechanical force on the flexible container 200 and squeeze the fluid out of the flexible container 200, a clamp 166 may be provided as shown in FIG. 23. The clamp 166 may be attached to the end of the first roller 161, and/or attachable to the end of the first roller 161, and may clamp together against the third mount 176 by operating the handle of the clamp 166. Although the clamp 166 shown in FIG. 23 is a manual over-center clamp, other configurations and clamping devices may be implemented to lock the first roller 161 into the mounting slot 173.

The dispensing device 110 may also be provided with a pump 310 to assist in the removal of fluid from the flexible container 200. Accordingly, using a handle 340, a connector 320 may be releasably attached to the outlet 220 of the container for permitting the communication between the flexible container 200 and the pump 310. Thus, when the connector 320 is attached to the outlet 220 the pump 310 may be made operational and begin emptying the flexible container 200 of fluid through a system outlet 330. Accordingly, the pump 310 may be operated as necessary for the given application and may be used to empty a portion of the flexible container 200 prior to locking the first roller 161 into the mounting slot 173 to enable sufficient clearance below the lid 210.

The lid 210 may thus be moved in a direction away from the base 132 by operation of the actuator 167 to rotate the drive roller 168. Once the extensions 184 have been substantially wrapped about drive roller 168, the lid 210 will typically be maintained in the recess 169. Thus, the lid 210 may be stored in the recess 169 and will not interfere with the flexible container 200 as it is drawn in a direction away from the base 132 and wraps around drive roller 168.

In order to substantially avoid failure of the drive roller 168 due to uneven wrapping of the evacuated portion of the flexible container 200, guides 164 may be implemented. As can be seen in FIGS. 23-27, guides 164 are positioned below the dispensing mechanism support 170 and may encourage the portion of the flexible container 200 entering the dispensing mechanism 160 to conform to the width of the drive roller 168. Although guides 164 are shown as rollers mounted to the dispensing mechanism support 170, other configurations may be implemented in accordance with the present invention such that the portion of the flexible container 200 entering the dispensing mechanism 160 is generally conformed to the width of the drive roller 168.

The linkage 150 provides the dispensing device 110 with an adequate range of motion to empty the flexible container 200. FIG. 27 illustrates a loading position L, wherein the dispensing mechanism support 170 and dispensing mechanism 160 is positioned such that a crane or other lifting apparatus may have adequate clearance for positioning the flexible container 200 to be emptied in the desired location.

A starting position I, illustrated in FIG. 27, has the dispensing mechanism 160 positioned just above the lid 210 of the flexible container 200 for emptying the flexible container 200. As shown, the linkage 150 will define the maximum height H that will be attained once the dispensing process is commenced. This is desirable where the dispensing device 110 is required to be mobile and transported between locations for multiple dispensing sites while remaining beneath any required clearance C.

The lid 210 may be secured by the holder 180 and the drive roller 168 operated to tension the flexible container 200 from the starting position I. The first roller 161 may then be manually pivoted about one side of the lid 210 while the second roller 163 is positioned on an opposing side of the lid 210. More specifically, the first roller 161 may be pivoted about the first mounting bore 171 to disengage the mounting slot 173 of the dispensing mechanism support 170. The first roller 161 is returned into the mounting slot 173 below the lid 210, thus engaging the dispensing mechanism 160 with the flexible container 200. Accordingly, the clamp 166 of the dispensing device 110 may then force the first roller 161 into a locked position in order to have the flexible container 200 retained between the first and second rollers 161, 163.

By engaging the first and second rollers 161, 163 together, the flexible container 200 will be positioned between them enabling the dispensing of the fluid upon actuation of the drive roller 168. The dispensing mechanism 160 may then be implemented to create a dispensing force as the walls of the flexible container 200 are pressed together and the dispensing mechanism 160 wraps the flexible container 200 about the drive roller 168 and moves in a first downward direction toward the base 132 wrapping the flexible container 200 thereabout. As the drive roller 168 pulls the dispensing mechanism 160 downward, the dispensing mechanism 160 will pivot about the first and second revolute joints 152, 158. Thus, as the drive roller 168 is rotated by the actuator 167, the dispensing mechanism 160 moves in a first direction toward the base 132 until the flexible container 200 is emptied as shown in an ending position III.

The dispensing mechanism 160 may thus be forced to the ending position III as illustrated in FIG. 27 having the flexible container 200 substantially emptied and deformed as shown in phantom lines. Pump 310 may then be used to pump any remaining fluid from the flexible container 200 if desired. It is understood that the material described as being in the container may include semi-fluids, grease, friction modifying materials or other viscous materials.

Generally, to use either dispensing device 10, 110, an operator would generally position the dispensing device 10, 110 or the pallet 100 having flexible container 200 positioned thereon, such that the dispensing mechanism 60, 160 may be positioned about the flexible container 200. The lid 210 is then secured by the holder 80, 180. The dispensing mechanism 60, 160 may then be activated causing the actuators 67, 167 to dispense the fluid in the flexible container 200 through the outlet 220. Thus, by providing a dispensing device 10, 110 multiple flexible containers 200 may be emptied quickly and efficiently.

The fluid, which can be a friction modifying material such as grease, for example, will be dispensed to a receptacle. The receptacle may be a wayside rail receptacle or a receptacle in a vehicle so that the fluid or friction modifying material can then be applied rails through a wayside distribution system, well known in the art, or via a distribution system attached to a vehicle.

Although the illustrated embodiments show multiple pallets 100 of containers 200 on the transport vehicle 300, assembly line systems that may be automated may also be used. Thus, a robotic-type line assembly may be configured using the present invention in a manufacturing environment to dispense fluid to various apparatuses requiring the same to be replenished.

It will be readily appreciated by those skilled in the art that modification may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A dispensing device for dispensing fluid from a flexible container, the dispensing device comprising:
   a support including a base and at least one upright member extending from the base;
   a linkage pivotally attached to the at least one upright member of the support; and
   a roller mechanism attached to and extending from the linkage, wherein the roller mechanism includes first and second squeeze members and a drive roller, the first and second squeeze members being configured to engage a flexible container and coact with the drive roller to move the roller mechanism in a first direction to dispense fluid from a flexible container.

2. The dispensing device of claim 1, wherein the roller mechanism further comprises a clamp configured to maintain the squeeze members in an engaged position with the flexible container for dispensing fluid from the flexible container.

3. The dispensing device of claim 1, wherein the roller mechanism further comprises guide members attached to the roller mechanism and configured to engage the flexible container as the roller mechanism moves in the first direction.

4. The dispensing device of claim 1, further comprising an actuator pivotally supported on one end to the support and on another end to the linkage wherein the actuator is configured to reposition the linkage.

5. The dispensing device of claim 1, wherein the dispensing device further comprises a holder attached to the drive roller and configured to engage the flexible container, wherein the drive roller defines a recess having the holder secured therein.

6. The dispensing device of claim 1, further comprising said flexible container, said flexible container having an outlet wherein the dispensing device is configured to dispense fluid through the outlet.

7. The dispensing device of claim 1, wherein at least one of the first and second squeeze members is pivotable for positioning the first and second squeeze members in engagement with a flexible container.

* * * * *